United States Patent
Thompson et al.

(10) Patent No.: US 9,872,427 B2
(45) Date of Patent: Jan. 23, 2018

(54) SECONDARY SEED TANK FOR AIR CART SYSTEM

(71) Applicant: CNH Industrial Canada, Ltd., Saskatoon (CA)

(72) Inventors: Dennis George Thompson, Saskatoon (CA); Martin J. Roberge, Saskatoon (CA); Graham Douglas Stuart, Warman (CA); Cory Adrian Yuen, Saskatoon (CA); Robin Bruno Schilling, Darfield (CA); Darwin L. Zacharias, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 16 days.

(21) Appl. No.: 14/929,675

(22) Filed: Nov. 2, 2015

(65) Prior Publication Data

US 2016/0120100 A1    May 5, 2016

Related U.S. Application Data

(60) Provisional application No. 62/075,142, filed on Nov. 4, 2014.

(51) Int. Cl.
*A01C 15/00*    (2006.01)

(52) U.S. Cl.
CPC .......... *A01C 15/006* (2013.01); *A01C 15/003* (2013.01)

(58) Field of Classification Search
CPC ... A01C 15/0003; A01C 15/00; A01C 15/006; A01C 15/005
See application file for complete search history.

(56) References Cited

U.S. PATENT DOCUMENTS

| 1,477,345 A | 12/1923 | Hagadone |
| 2,327,494 A | 8/1943 | Brown |

(Continued)

FOREIGN PATENT DOCUMENTS

| AU | 2011239223 B2 | 5/2013 |
| CA | 2245338 A1 | 2/2000 |

(Continued)

OTHER PUBLICATIONS

Bourgault Industries Ltd.; Product Catalogue; Oct. 2006; http://www.bourgault.com/LinkClick.aspx?fileticket=iLUTx7kVhnl%3D&tabid=416&language=en-US accessed Oct. 30, 2015.

(Continued)

*Primary Examiner* — Christopher J. Novosad
(74) *Attorney, Agent, or Firm* — Rebecca L. Henkel; Rickard K. DeMille

(57) ABSTRACT

An air cart system includes a container assembly mounted on wheels and including a primary product container and an air distribution network including a product conduit that delivers a first agricultural product and a second agricultural product to an agricultural implement. The air cart system includes a first metering device to meter the first agricultural product from the primary product container to the product conduit. A fill hopper mounts on a side of the container assembly, and a secondary product container mounts beneath a portion of the primary product container. The secondary product container receives the second agricultural product from the fill hopper, which receives the second agricultural product at an opening and conveys the second agricultural product to the secondary product container. The air cart system includes a second metering device to meter the second agricultural product from the secondary product container to the product conduit.

20 Claims, 5 Drawing Sheets

(56) References Cited

U.S. PATENT DOCUMENTS

| | | |
|---|---|---|
| 2,491,232 A | 12/1949 | Turnbull |
| 2,560,431 A | 7/1951 | Garber |
| 2,682,428 A * | 6/1954 | Roberts ............ A01C 7/004 111/130 |
| 4,060,181 A | 11/1977 | Grataloup |
| 4,186,885 A | 2/1980 | Christian |
| 4,296,695 A | 10/1981 | Quanbeck |
| 4,473,016 A | 9/1984 | Gust |
| 4,630,773 A | 12/1986 | Ortlip |
| 4,905,912 A | 3/1990 | Bruch |
| 4,944,637 A | 7/1990 | Fletcher |
| 5,379,812 A | 1/1995 | McCunn et al. |
| 5,392,722 A | 2/1995 | Snipes et al. |
| 5,575,225 A | 11/1996 | Smith et al. |
| 5,592,889 A | 1/1997 | Bourgault |
| 5,628,262 A | 5/1997 | Nelson |
| 5,740,746 A | 4/1998 | Ledermann et al. |
| 5,802,994 A | 9/1998 | Kinkead et al. |
| 5,842,428 A | 12/1998 | Stufflebeam et al. |
| 5,878,679 A | 3/1999 | Gregor et al. |
| 5,898,376 A | 4/1999 | Webb |
| 5,915,312 A | 6/1999 | Meyer et al. |
| 5,947,040 A | 9/1999 | Gregor |
| 5,980,163 A | 11/1999 | Gregor et al. |
| 6,003,455 A | 12/1999 | Flamme et al. |
| 6,138,770 A * | 10/2000 | Kayser ............ A01B 59/06 172/272 |
| 6,148,863 A | 11/2000 | Memory et al. |
| 6,213,690 B1 | 4/2001 | Gregor et al. |
| 6,584,919 B2 | 7/2003 | McQuinn |
| 6,668,738 B2 | 12/2003 | Lee et al. |
| 6,675,728 B2 | 1/2004 | Lee et al. |
| 6,688,245 B2 | 2/2004 | Juptner |
| 6,845,724 B2 | 1/2005 | Mayerle et al. |
| 6,883,445 B2 | 4/2005 | Mayerle |
| 6,928,938 B2 | 8/2005 | Memory |
| 7,104,478 B2 | 9/2006 | Niemela et al. |
| 7,270,065 B2 | 9/2007 | Conrad |
| 7,380,733 B2 | 6/2008 | Owenby et al. |
| 7,469,915 B2 | 12/2008 | Horn et al. |
| 7,500,814 B2 | 3/2009 | Meyer |
| 7,500,817 B2 | 3/2009 | Furrer et al. |
| 7,549,383 B2 | 6/2009 | Sauder et al. |
| 7,703,404 B2 | 4/2010 | Horn et al. |
| 7,735,437 B2 | 6/2010 | Pollington et al. |
| 7,779,769 B2 | 8/2010 | Memory |
| 7,798,078 B2 | 9/2010 | Memory |
| 8,074,586 B2 | 12/2011 | Garner et al. |
| 8,262,004 B2 | 9/2012 | Gamble, II et al. |
| 8,342,373 B2 | 1/2013 | Memory et al. |
| 8,386,137 B2 | 2/2013 | Sauder et al. |
| 8,408,478 B2 | 4/2013 | Wonderlich |
| 8,504,310 B2 | 8/2013 | Landphair et al. |
| 8,517,118 B2 | 8/2013 | Remoué |
| 8,683,930 B2 | 4/2014 | Cresswell et al. |
| 2005/0072954 A1 | 4/2005 | Nielsen |
| 2005/0235890 A1 | 10/2005 | Mariman et al. |
| 2006/0120836 A1 | 6/2006 | Cresswell et al. |
| 2007/0163660 A1 | 7/2007 | Mowatt et al. |
| 2010/0224110 A1 | 9/2010 | Mariman |
| 2011/0035163 A1 | 2/2011 | Landphair |
| 2011/0167712 A1 | 7/2011 | Brasil |
| 2011/0283609 A1 * | 11/2011 | Leach ............ A01M 21/04 47/1.43 |
| 2012/0103238 A1 | 5/2012 | Beaujot et al. |
| 2012/0201631 A1 | 8/2012 | Fitzgerald et al. |
| 2012/0211508 A1 | 8/2012 | Barsi et al. |
| 2012/0230779 A1 | 9/2012 | Dunstan |
| 2012/0301231 A1 | 11/2012 | Jagow et al. |
| 2012/0312210 A1 | 12/2012 | Riffel et al. |
| 2012/0316736 A1 | 12/2012 | Hubalek et al. |
| 2012/0325809 A1 | 12/2012 | Hall et al. |

FOREIGN PATENT DOCUMENTS

| | | |
|---|---|---|
| CA | 2755585 A1 | 4/2013 |
| CN | 200944739 Y | 9/2007 |
| CN | 201022263 Y | 2/2008 |
| DE | 19826944 A1 | 12/1999 |
| DE | 10051526 A1 | 4/2002 |
| DE | 10319047 A1 | 11/2004 |
| EP | 2060163 A1 | 5/2009 |
| GB | 900255 | 7/1962 |
| GB | 2307680 A | 6/1997 |
| WO | 2014096671 A1 | 6/2014 |
| WO | 2014147004 A1 | 9/2014 |

OTHER PUBLICATIONS

Bourgault North America; Model 7950 Air Seeder; 2012; http://www.bourgault.com/SearchProduct/ViewProduct/tabid/168/docid/387/IsSearch/false/New/true/mode/1/language/en-US/Default.aspx accessed Oct. 30, 2015.

U.S. Appl. No. 14/930,411, filed Nov. 2, 2015, Robin Bruno Schilling.

* cited by examiner

SECONDARY SEED TANK FOR AIR CART SYSTEM

CROSS-REFERENCE TO RELATED APPLICATION

This application claims priority from and the benefit of U.S. Provisional Application Ser. No. 62/075,142, entitled "SECONDARY SEED TANK FOR AIR CART SYSTEM", filed Nov. 4, 2014, which is hereby incorporated by reference in its entirety.

BACKGROUND

The present disclosure relates generally to agricultural implements and, more particularly, to storage and metering of a granular agricultural product to ground engaging opener assemblies on agricultural implements.

Generally, agricultural implements are towed behind an off-road work vehicle, such as a tractor. The agricultural implements may include multiple rows of ground engaging opener assemblies to excavate trenches into soil for depositing a granular product, such as seeds or fertilizer. An air cart may be towed behind the implement and configured to provide the granular product to the ground engaging opener assemblies. In this manner, rows of the granular product may be deposited into the soil. Further, some granular products may be deposited into the soil in small quantities (e.g., canola seed), making it desirable to store the granular product in a smaller secondary container in the air cart. Unfortunately, the smaller secondary container may be difficult to access and supply with the granular product.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

A first embodiment describes an air cart system including a container assembly mounted on wheels and including at least one primary product container. Additionally, the air cart system includes an air distribution network including at least one product conduit that delivers a first agricultural product and a second agricultural product to an agricultural implement. Further, the air cart system includes at least one first metering device to meter the first agricultural product from the at least one primary product container to the at least one product conduit. The air cart system also includes a fill hopper mounted on a side of the container assembly and a secondary product container mounted beneath a portion of the at least one primary product container. The secondary product container receives the second agricultural product from the fill hopper, and the fill hopper receives the second agricultural product at an opening of the fill hopper and conveys the second agricultural product to the secondary product container. Moreover, the air cart system includes at least one second metering device to meter the second agricultural product from the secondary product container to the at least one product conduit.

A second embodiment describes an air cart system including a container assembly mounted on wheels and including a first primary product container and a second primary product container. Additionally, the air cart system includes an air distribution network with at least one product conduit to deliver a first agricultural product and a second agricultural product to an agricultural product distribution device. Further, the air cart system includes a first metering device to meter the first agricultural product from the first primary product container to the at least one product conduit, and the air cart system also includes a second metering device configured to meter the first agricultural product from the second primary product container to the at least one product conduit. Furthermore, the air cart system includes a fill hopper mounted on a side of the container assembly, and a secondary product container mounted beneath at least a portion of the first primary product container and at least a portion of the second primary product container. The secondary product container receives the second agricultural product from the fill hopper, and the fill hopper receives the second agricultural product at an opening of the fill hopper and conveys the second agricultural product to the secondary product container. Moreover, the air cart system includes a third metering device to meter the second agricultural product from the secondary product container to the at least one product conduit.

A third embodiment describes an air cart system including a first primary product container and a second primary product container each mounted on a wheeled frame and each available to store primary agricultural product. Additionally, the air cart system includes a secondary product container mounted beneath and between respective portions of the first and second primary product containers and a fill hopper mounted on a side of the wheeled frame. The fill hopper conveys secondary agricultural product to the secondary product container via an air stream. Further, the air cart system includes at least one product conduit line to convey the primary and secondary agricultural products from the primary product containers and the secondary product container to an agricultural implement. Furthermore, the air cart system includes at least one metering device for each of the primary product containers and the secondary product container to meter the respective agricultural product into the at least one product conduit.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to a system for storing granular agricultural product and for providing the granular product to ground engaging opener assemblies. The system includes a secondary product container mounted to an air cart for storage of granular agricultural product. Moreover, the system includes a fill system for the secondary product container including a pneumatic conveyance system. For example, an operator may load granular agricultural product into a fill hopper, which may be positioned less than 5 feet (1.5 meters) above ground level, and the pneumatic conveyance system may then convey the granular agricultural product to the secondary product container.

Figure 1:
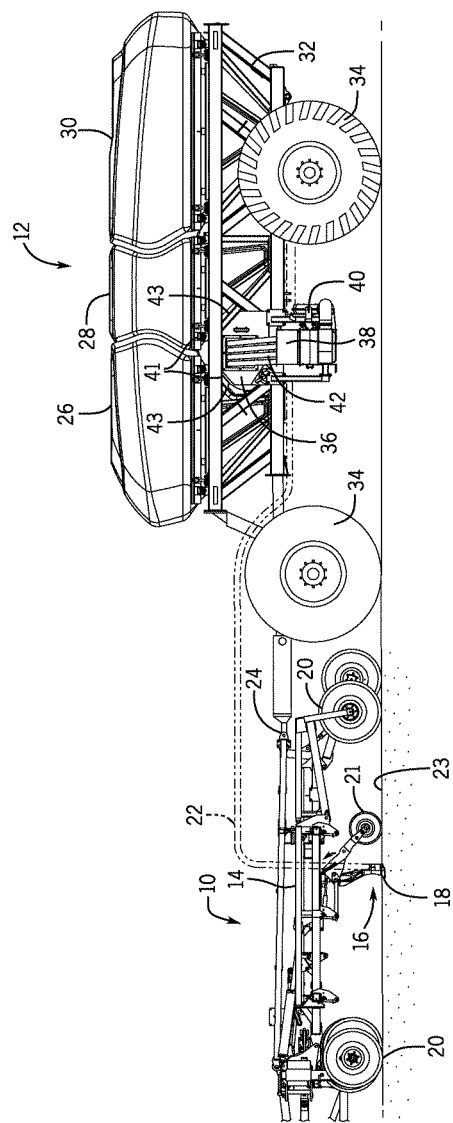
FIG. 1 is a side view of an agricultural implement with an air cart, in accordance with an embodiment.

To help illustrate, a side view of an agricultural implement 10 coupled to an air cart 12 is shown in FIG. 1. As depicted, the agricultural implement 10 includes a tool frame 14 coupled to a row unit 16, including an opener 18, and wheel assemblies 20. The agricultural implement may be pulled by an off-road work vehicle (e.g., a tractor) to deposit rows of product. Accordingly, the wheel assemblies 20 may contact the soil surface to enable the agricultural implement 10 to be pulled by the off-road work vehicle. As the agricultural implement 10 is pulled, a row of product may be deposited in the soil by the row unit 16. Although only one row unit 16 is shown, the agricultural implement 10 may include multiple row units 16 organized in a row across the agricultural implement 10. In some embodiments, the agricultural implement 10 may include a row of 12, 14, 16, 18, 20, or more row units 16, which may each deposit a row of seeds.

To facilitate depositing seeds, each row unit 16 includes the opener 18 and a press wheel 21. More specifically, when the opener 18 engages the soil 23, the opener 18 exerts a downward force that excavates a trench into the soil 23 as the row unit 16 travels across the soil 23. As the agricultural implement 10 moves through the field, the row unit 16 may deposit seeds into the excavated trench. Then, the press wheel 21 may pack soil onto the deposited seeds.

The flow rate of seeds from the row unit 16 may be controlled by the rate of seeds from the air cart 12. In some embodiments, the air cart 12 may pneumatically distribute the seeds or other granular agricultural products to the row unit 16 via a primary distribution hose 22. In other words, the air cart 12 may control the seed flow rate from the row unit 16 by controlling the rate at which seeds are supplied to the row unit 16. Additionally, the air cart 12 may supply seeds to multiple ground engaging opener assemblies 16. As such, the air cart 12 may control the seed deposition rate into multiple rows.

In the depicted embodiment, the air cart 12 is towed behind the agricultural implement 10. More specifically, the agricultural implement 10 may be coupled to the off-road work vehicle by a first hitch assembly (not shown), and the air cart 12 may be coupled to the agricultural implement 10 by a second hitch assembly 24. However, in other embodiments, the agricultural implement 10 may be towed behind the air cart 12. In further embodiments, the implement 10 and the air cart 12 may be part of a single unit that is towed behind an off-road work vehicle, or the implement 10 and the air cart 12 may be elements of a self-propelled vehicle.

The air cart 12 may centrally store seeds and distribute the seeds to the ground engaging opener assemblies 16. Accordingly, as depicted, the air cart 12 includes three primary product containers 26, 28, and 30, a frame 32, and wheels 34. Further, the air cart 12 includes a secondary product container 36, a fill hopper 38, an air supply 40, and product conveyance conduits 42. The towing hitch 24 is coupled between the tool frame 14 and the air cart frame 32, which enables the air cart 12 to be towed with the agricultural implement 10. Further, the fill hopper 38 enables an operator to fill the secondary product container 36. Accordingly, the fill hopper 38 is located on a side of the air cart 12 and at a level above the soil 23 that facilitates access by the operator (e.g., from ground level or from a bed of a truck). For example, an opening of the fill hopper 38, which receives the granular agricultural product, may be located less than 5 feet (1.5 meters) above the ground. At this height, the operator may load the fill hopper 38 from ground level or from a truck bed, for example.

Additionally, the primary product containers 26, 28, and 30, and the secondary product container 36 may centrally store the granular agricultural product (e.g., seeds, granular fertilizer, granular inoculants, etc.). In some embodiments, the primary product containers 26, 28, and 30 may each include a single large storage compartment for storing a single agricultural product. As illustrated, the primary product containers 26, 28, and 30 may each store a different agricultural product. For example, the primary product container 26 may store legume seeds while the primary product container 28 may store a dry fertilizer. Additionally, in this example, the secondary product container 36 may store granular inoculants, which are planted in conjunction with the legume seeds. In such configurations, the air cart 12 may deliver seed, fertilizer, and inoculant to the implement 10 via separate distribution systems, or as a mixture through a single distribution system.

Further, as illustrated, the secondary product container 36 is positioned beneath portions of the primary product containers 26 and 28, and the secondary product container 36 may include storage for more than 15 bushels of the granular agricultural product. To improve storage capacity of the secondary product container 36, upper walls 41 of the secondary product container 36 have slopes that substantially correspond to respective slopes of bottom portions 43 of the primary product containers 26 and 28. Therefore, the shape of the secondary product container 36 enables the secondary product container 36 to utilize a substantial portion of the space between the primary product containers 26 and 28. Similarly, in an alternative embodiment, the secondary product container 36 could be positioned between the primary product containers 28 and 30.

Figure 2:
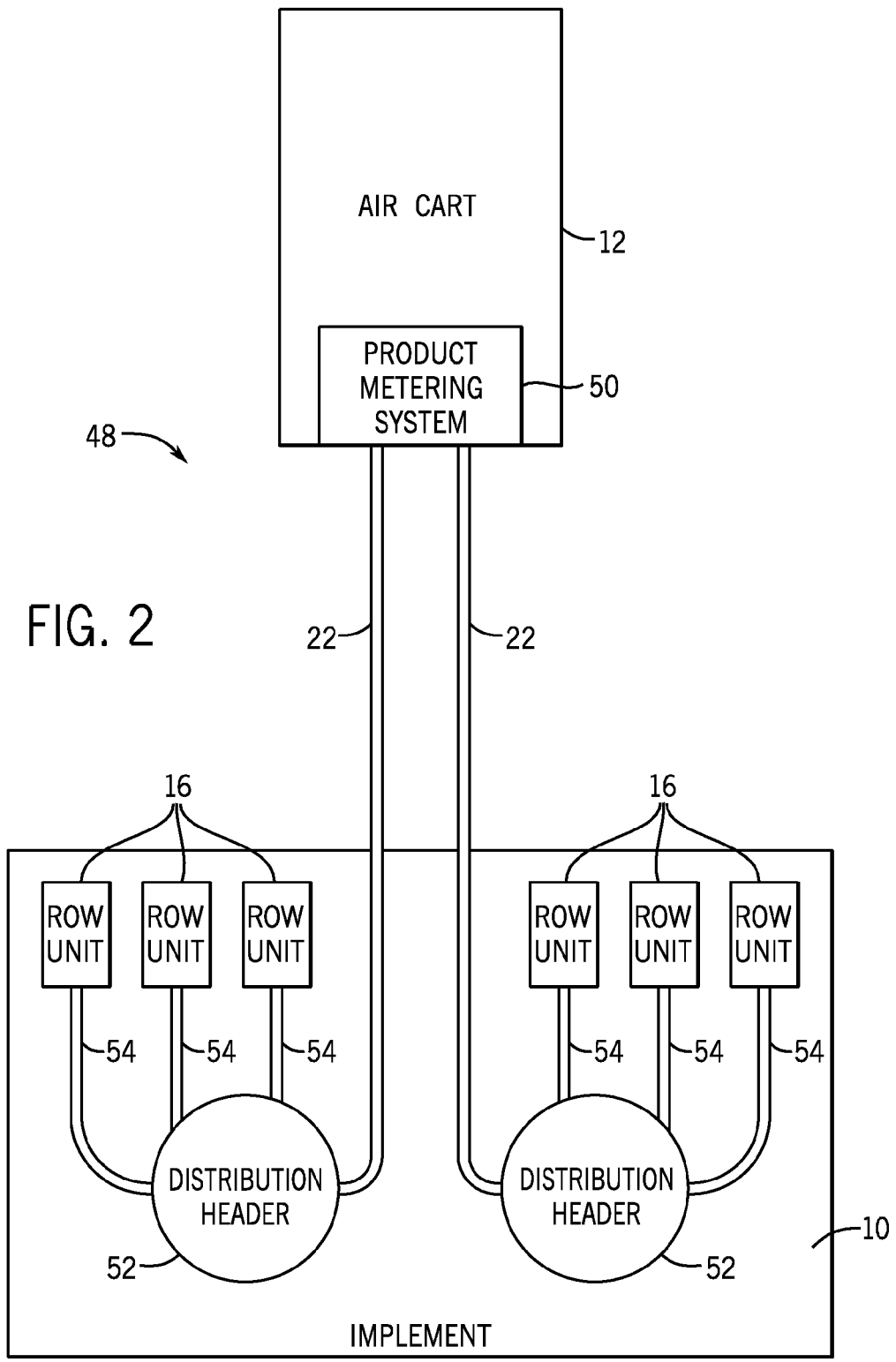
FIG. 2 is a schematic diagram of an air cart coupled to an implement, as shown in FIG. 1, illustrating a metering system including multiple product flow paths, in accordance with an embodiment.

FIG. 2 is a schematic diagram of the air cart 12 coupled to the implement 10, as shown in FIG. 1, illustrating a distribution system 48 including a product metering system 50 and multiple product flow paths. In the illustrated embodiment, the distribution system 48 includes the product metering system 50, the primary distribution hoses 22, distribution headers 52, and secondary distribution hoses 54. The granular agricultural product is delivered from the air cart 12 to the row units 16 using the distribution system 48. For example, the distribution system 48 transfers the agricultural product using the product metering system 50 to primary distribution hoses 22. Subsequently, the primary distribution hoses 22 transfer the agricultural product to the distribution headers 52 positioned on the implement 10. Finally, the distribution headers 52 transfer the product through the secondary distribution hoses 54 to deliver the product to the row units 16 of the implement 10.

The air cart 12 may contain one product or multiple products that are transferred using the distribution system 48. For example, certain distribution systems 48 are configured to mix multiple products, and transfer the products together to the row units 16. Such systems may be known as "single shoot" distribution systems 48. Alternatively, certain distribution systems 48 are configured to transfer product separately to the row units 16. Such systems may be known as "double shoot" systems 48. The air cart 12, as shown in FIG. 2, includes a single shoot distribution system 48. However, other embodiments within the scope of this disclosure may include double shoot distribution systems 48.

The product metering system 50 controls the rate at which product is transferred to the primary distribution hoses 22. For example, the product metering system 50 may contain one or more meter rollers that transfer the product from the air cart 12 to the primary distribution hoses 22. In configurations that employ multiple meter rollers, the meter rollers may be configured to operate collectively or individually. For example, if the implement passes over a swath of soil that is partially planted, the distribution system may activate certain meter rollers to deliver product to row units in the unplanted sections while deactivating other meter rollers to block product delivery to row units in the planted sections. In this manner, the implement may provide a substantially even distribution of product to the soil 23, thereby substantially reducing wasted product associated with double-planting certain areas of the soil 23. A controller may be used to control the operation of the meter rollers. The controller may control whether meter rollers are started or stopped, and/or determine a turn rate for each individual meter roller. In addition, the meter rollers may also contain a holding chamber to provide a steady flow of product to the primary distribution hoses 22. Further, each of the primary storage containers 26, 28, and 30, and the secondary storage container 36 may have independent metering systems 50.

The primary distribution hoses 22 are coupled to the product metering system 50 and configured to receive product from the product metering system 50. Although two primary distribution hoses 22 are depicted, any suitable number of hoses may be used. For example, some embodiments may only use one primary distribution hose 22, while other embodiments use 3, 4, 5, 6, 7, 8, 9, 10 or more primary distribution hoses 22. The number and length of primary distribution hoses 22 may be at least partially dependent on the output of an air source, the type of product being used, and/or the configuration of the implement 10 connected to the primary distribution hoses 22.

The distribution headers 52 receive the product from the primary distribution hoses 22. Generally, the number of distribution headers 52 matches the number of primary distribution hoses 22. However, some embodiments may incorporate multiple primary distribution hoses 22 into a single distribution header 52, or one primary distribution hose 22 may be coupled to multiple distribution headers 52. In addition, there may be any suitable number of distribution headers 52. For example, some embodiments may use only one distribution header 52, while other embodiments use 3, 4, 5, 6, 7, 8, 9, 10 or more distribution headers 52. The distribution headers 52 distribute the product along the secondary distribution hoses 54. While three secondary distribution hoses 54 are depicted for each of the distribution headers 52, any suitable number of the secondary distribution hoses 54 may be used.

The secondary distribution hoses 54 provide a flow path for the product to be transferred from the distribution header 52 to the row units 16. Generally there is a secondary distribution hose 54 for each row unit 16. However, there may be multiple secondary distribution hoses 54 going to a single row unit 16, or one secondary distribution hose 54 may provide product to multiple row units 16. For example, a double shoot system, where multiple products are transferred separately, may have multiple secondary distribution hoses 54 going to a single row unit 16.

In certain embodiments, the distribution system 48 enables individual or combined control of product distribution from the air cart 12 to the primary distribution hoses 22. For example, the distribution system 48 may individually stop, start, and/or regulate product delivery rates for each primary distribution hose 22. In addition, the distribution system 48 may block the flow of product when portions of the product metering system 50 are stopped.

Figure 3:
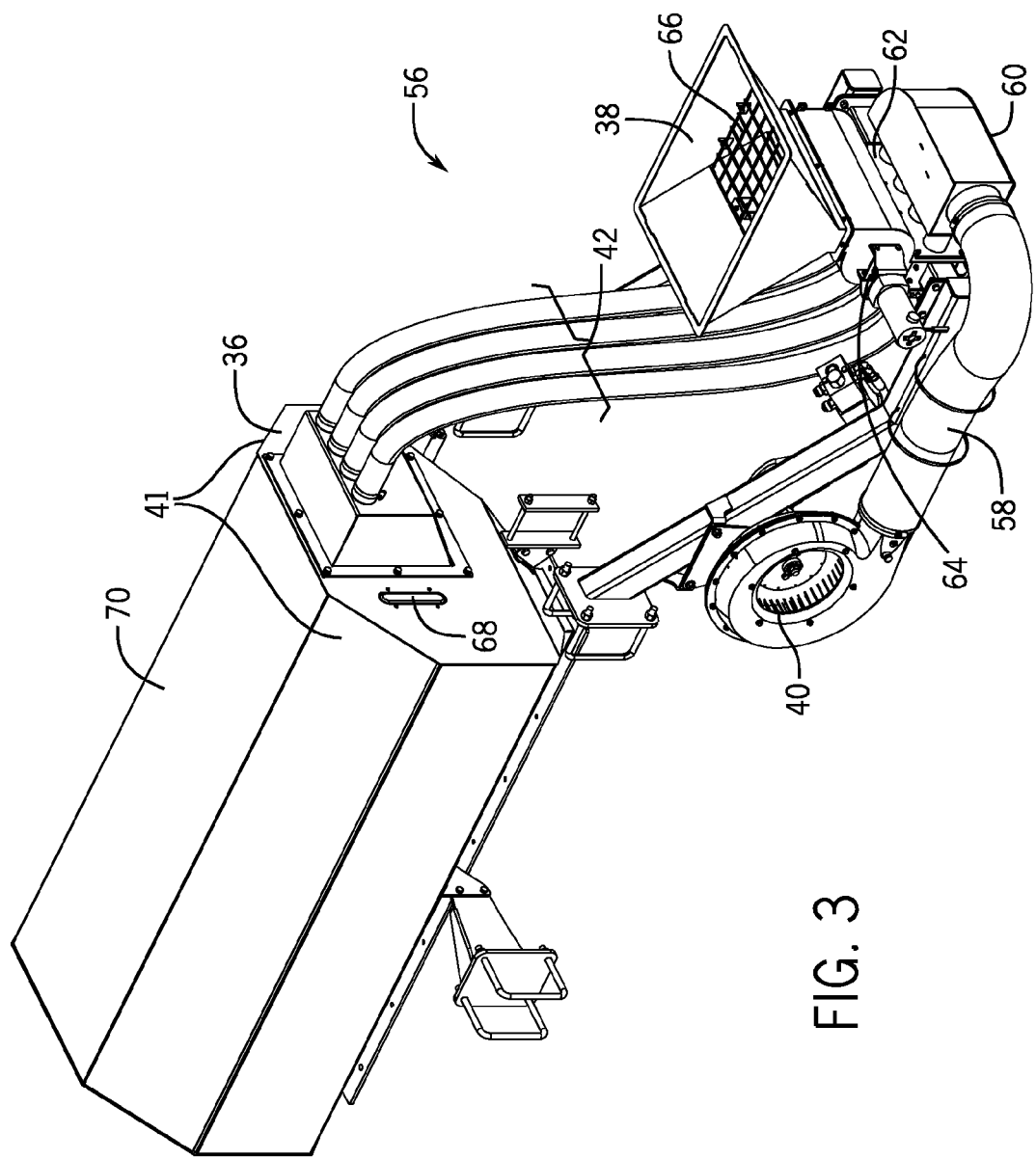
FIG. 3 is a rear perspective view of a secondary product container and a product fill system 56 of the air cart illustrated in FIG. 1, in accordance with an embodiment.

FIG. 3 is a rear perspective view of the secondary product container 36 and a product fill system 56 of the air cart 12. As illustrated, the product fill system 56 includes the fill hopper 38, the air supply 40 (e.g., a fan), an air conveyance hose 58, an air plenum 60, an inductor manifold 62, an air lock 64, and the product conveyance conduits 42. The air supply 40 provides air flow to the air plenum 60 via the air conveyance hose 58. The air plenum 60, in turn, evenly divides the air flow entering the inductor manifold 62. Additionally, a venturi (not shown) is disposed between the air plenum 60 and the inductor manifold 62 and fluidizes the granular agricultural product by drawing the granular agricultural product from the inductor manifold 62 into the air flow. Once the granular agricultural product is fluidized by the venturi, the product conveyance conduits 42 convey the granular product to the secondary product container 36. In another embodiment, the product fill system 56 may also include other pneumatic systems configured to convey the granular agricultural product to the secondary product container 36.

To facilitate filling the secondary product container 36, the fill hopper 38 is loaded with the granular agricultural product as the air supply 40 provides the air flow to the product fill system 56. The fill hopper 38, as illustrated, includes a grate 66 over an opening of the fill hopper 38. The grate 66 is configured to block large objects from entering the product fill system 56. For example, the grate 66 may break up portions of the granular agricultural product that are clumped together, thereby facilitating a substantially continuous flow of product into the product fill system 56. Further, the grate 66 may block unwanted foreign objects, such as rocks or other large debris, from entering the secondary product container 36. While the grate 66 is employed in the present embodiment, it may be appreciated that some alternative embodiments of the present disclosure may not include the grate 66.

Once the granular agricultural product enters the fill hopper 38, the air lock 64 provides the granular agricultural product to the inductor manifold 62. The air lock 64 may be a rotary air lock that meters the granular agricultural product from the fill hopper 38 to the inductor manifold 62 while substantially blocking air flow from the product fill system 56 into the hopper. By metering the granular agricultural product into the inductor manifold 62, e.g., by controlling a rate of rotation of the air lock 64, the possibility of overfilling the inductor manifold 62 may be substantially reduced or eliminated. For example, the product fill system 56 may fill the secondary product container 36 at a rate of about 2 bushels per minute (e.g., of canola seed). Accordingly, the rate of rotation of the air lock 64 may likewise provide 2 bushels of the granular agricultural product (e.g., canola seed) per minute to the inductor manifold 62 for fluidization and transport to the secondary product container 36.

As the air lock 64 meters the granular agricultural product into the inductor manifold 62, the air flow through the venturi draws the granular agricultural product from the inductor manifold 62. The air flow then fluidizes the granular agricultural product, thereby enabling the product to flow through the product conveyance conduits 42 into the secondary product container 36. As the granular agricultural product flows into the secondary product container 36, a sight glass 68, which may be disposed on a side of the secondary product container 36, enables an operator to track remaining capacity of the secondary product container 36. The sight glass 68 may provide an indication to the operator of when to stop filling the secondary product container 36. For example, when the sight glass 68 is completely covered by the granular agricultural product, the operator may stop providing product to the fill hopper 38. In other embodiments, there may be a sensor disposed within the secondary container 36, or within the product fill system 56, that may likewise indicate the fill level of the secondary product container 36 or indicate when to stop filling the fill hopper 38.

Figure 4:
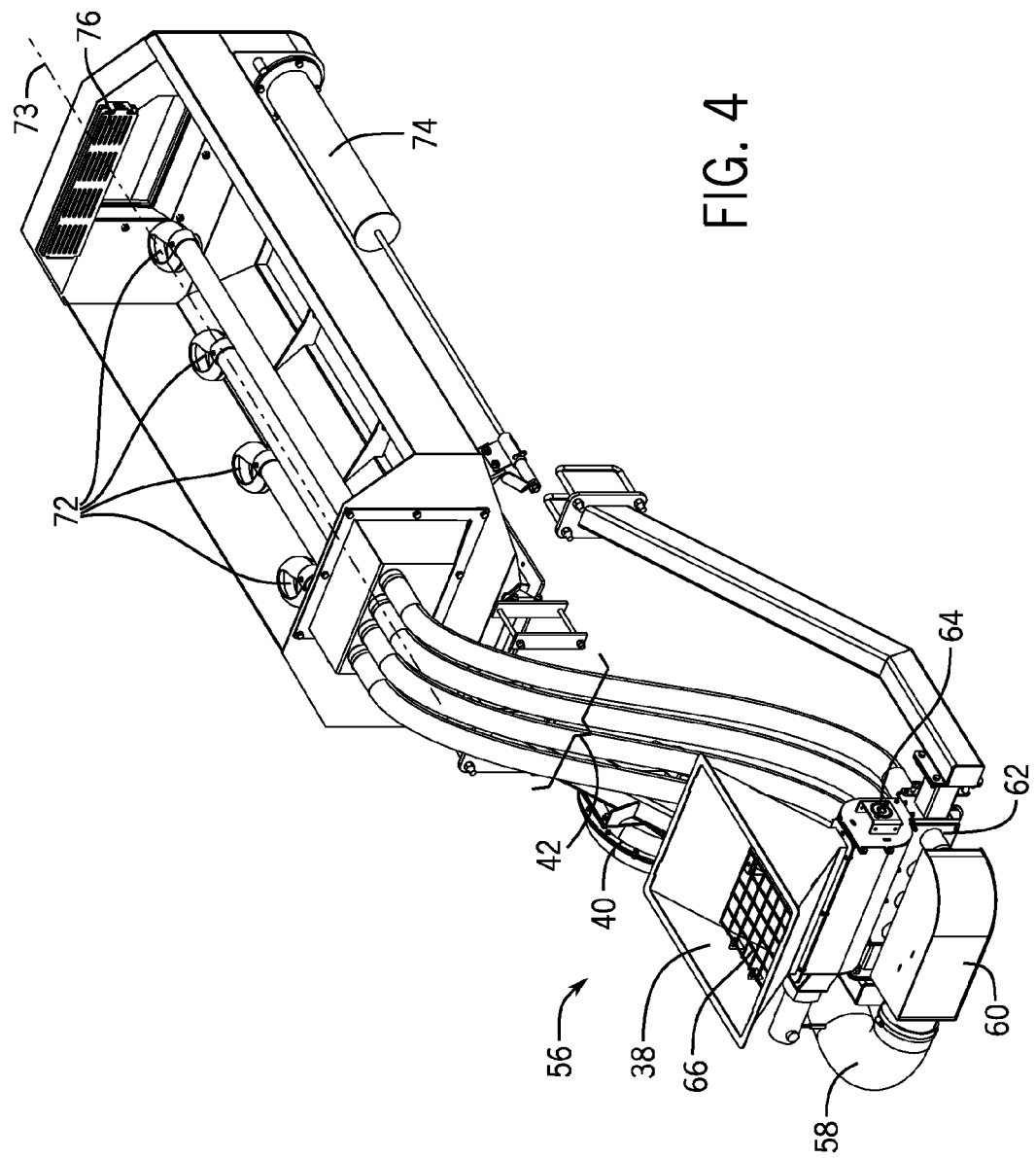
FIG. 4 is a front perspective view of the secondary product container with a top removed for clarity and the product fill system 56 of the air cart illustrated in FIG. 1, in accordance with an embodiment.

FIG. 4 is a front perspective view of the product fill system 56 and the secondary product container 36 with a top 70 of the secondary product container 36 removed for clarity. As illustrated, the product conveyance conduits 42 feed the granular agricultural product to a series of cyclones 72 within the secondary product container 36. The cyclones 72 are configured to deposit the granular agricultural product within the secondary product container 36 in a substantially even distribution. For example, as illustrated, the cyclones 72 terminate at different distances along a lateral axis 73 of the secondary product container 36. Because the cyclones 72 terminate at different lateral positions, the cyclones 72 promote even distribution of the granular agricultural product within the secondary product container 36. Additionally, the cyclones 72 operate by transferring lateral energy of the fluidized granular agricultural product into vertical energy, and directing the granular agricultural product toward a bottom of the secondary tank 36.

After the granular agricultural product is deposited within the secondary product container 36, the air flow exits the secondary product container 36 via an exhaust 74. The exhaust 74 may take the form of any device configured to maintain the granular agricultural product within the secondary product container 36 while enabling excess pressure within the secondary product container 36, e.g., resulting from the continuous flow of air into the secondary product container 36, to exhaust. In the illustrated embodiment, media screens 76 on a rear wall of the secondary product container 36 maintains the granular agricultural product within the secondary product container 36 while enabling the excess air to exit the secondary product container 36 through the exhaust 74.

Figure 5:
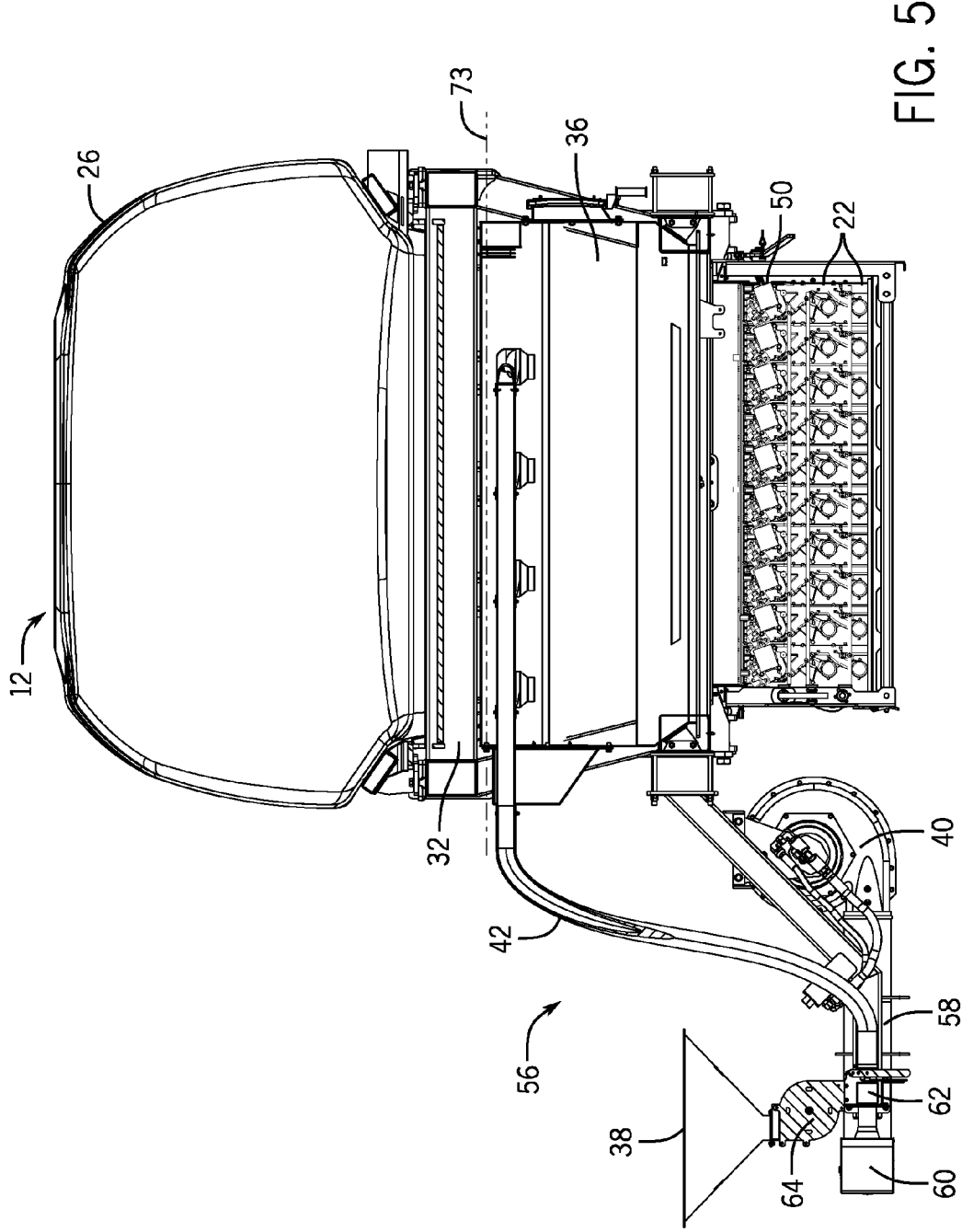
FIG. 5 is a front view of the air cart illustrated in FIG. 1, in accordance with an embodiment.

FIG. 5 is a front view of the air cart 12. As illustrated, a product metering system 50 is coupled to the secondary product container 36. The product metering system 50 may include at least one meter roller assembly, which meters the granular agricultural product from the secondary product container 36 to the primary distribution hoses 22, as discussed above with reference to FIG. 2. Further, as illustrated, the meter rollers may span a bottom of the secondary product container 36 to provide metering of the granular agricultural product across a substantial portion of a lateral extent of the secondary product container 36. In this manner, the product metering system 50 may provide product directly into several of the primary distribution hoses 22. In another embodiment, the product metering system 50 may include a single meter roller. Additionally, the single meter roller may meter granular agricultural product into a single distribution hose 22 or into multiple distribution hoses 22.

Once the granular agricultural product is metered from the secondary product container 36 via the product metering system 50, the granular agricultural product may be conveyed via the primary distribution hoses 22 to the agricultural implement 10, as discussed above with reference to FIG. 1. Further, while the illustrated product metering system 50 includes multiple meter rollers coupled to the bottom of the secondary product container 36, it may be appreciated that the meter rollers may be replaced with any other suitable metering mechanism. Furthermore, it may be appreciated that the product metering system 50 and the primary distribution hoses 22 may be positioned beneath the primary product containers 26, 28, and 30 and between the wheels 34.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An air cart system, comprising:
   a container assembly mounted on wheels and comprising at least one primary product container;
   an air distribution network comprising at least one product conduit configured to deliver a first granular agricultural product and a second granular agricultural product to an agricultural implement;
   at least one first metering device configured to meter the first granular agricultural product from the at least one primary product container to the at least one product conduit;
   a fill hopper mounted on a side of the container assembly;
   a secondary product container mounted beneath a portion of the at least one primary product container, wherein the secondary product container is configured to receive the second granular agricultural product from the fill hopper, wherein the fill hopper is configured to receive the second granular agricultural product at an opening of the fill hopper and to convey the second granular agricultural product to the secondary product container; and
   at least one second metering device configured to meter the second granular agricultural product from the secondary product container to the at least one product conduit.

2. The air cart system of claim 1, wherein the fill hopper comprises an inductor manifold coupled to an air delivery system, and the air delivery system is configured to convey the second granular agricultural product to the secondary product container via an air stream.

3. The air cart system of claim 2, wherein a venturi is mounted on a bottom portion of the inductor manifold, and the venturi is coupled to an air source and at least one product conveyance conduit of the air delivery system.

4. The air cart system of claim 2, wherein the fill hopper comprises an air lock configured to cyclically provide a portion of the second granular agricultural product to the inductor manifold.

5. The air cart system of claim 4, wherein the air lock is configured to provide the second granular agricultural product to the inductor manifold at a substantially equal rate to a rate at which the second granular agricultural product flows from the inductor manifold to the secondary product container.

6. The air cart system of claim 1, wherein the opening of the fill hopper is positioned less than 1.5 meters above ground level such that the second granular agricultural product can be loaded by an operator standing at the ground level.

7. The air cart system of claim 1, comprising at least one cyclone positioned within the secondary product container, wherein the at least one cyclone is configured to evenly distribute the second granular agricultural product within the secondary product container.

8. An air cart system, comprising:
a container assembly mounted on wheels and comprising at least one primary product container;
an air distribution network comprising at least one product conduit configured to deliver a first agricultural product and a second agricultural product to an agricultural implement;
at least one first metering device configured to meter the first agricultural product from the at least one primary product container to the at least one product conduit;
a fill hopper mounted on a side of the container assembly;
a secondary product container mounted beneath a portion of the at least one primary product container, wherein the secondary product container is configured to receive the second agricultural product from the fill hopper, wherein the fill hopper is configured to receive the second agricultural product at an opening of the fill hopper and to convey the second agricultural product to the secondary product container; and
at least one second metering device configured to meter the second agricultural product from the secondary product container to the at least one product conduit;
a plurality of product conveyance conduits configured to convey the second agricultural product from the fill hopper to the secondary product container, wherein each of the plurality of product conveyance conduits terminates at a cyclone.

9. The air cart system of claim 8, wherein the cyclones are located at staggered distances along a lateral axis of the secondary product container.

10. The air cart system of claim 8, wherein the fill hopper comprises an inductor manifold coupled to the plurality of product conveyance conduits.

11. The air cart system of claim 10, wherein a venturi is mounted on a bottom portion of the inductor manifold, and the venturi is coupled to an air source and at least one product conveyance conduit of the plurality of product conveyance conduits.

12. The air cart system of claim 10, wherein the fill hopper comprises an air lock configured to cyclically provide a portion of the second agricultural product to the inductor manifold.

13. The air cart system of claim 8, wherein the opening of the fill hopper is positioned less than 1.5 meters above ground level such that the second agricultural product can be loaded by an operator standing at the ground level.

14. The air cart system of claim 8, wherein the at least one secondary metering device comprises multiple secondary metering devices positioned along a lateral axis of the secondary product container.

15. An air cart system, comprising:
a container assembly mounted on wheels and comprising at least one primary product container;
an air distribution network comprising at least one product conduit configured to deliver a first agricultural product and a second agricultural product to an agricultural implement;
at least one first metering device configured to meter the first agricultural product from the at least one primary product container to the at least one product conduit;
a fill hopper mounted on a side of the container assembly;
a secondary product container mounted beneath a portion of the at least one primary product container, wherein the secondary product container is configured to receive the second agricultural product from the fill hopper, wherein the fill hopper is configured to receive the second agricultural product at an opening of the fill hopper and to convey the second agricultural product to the secondary product container; and
a plurality of secondary metering devices positioned along a lateral axis of the secondary product container, wherein the plurality of secondary metering devices is configured to meter the second agricultural product from the secondary product container to the at least one product conduit.

16. The air cart system of claim 15, wherein the fill hopper comprises an inductor manifold coupled to an air delivery system, and the air delivery system is configured to convey the second agricultural product to the secondary product container via an air stream.

17. The air cart system of claim 16, wherein a venturi is mounted on a bottom portion of the inductor manifold, and the venturi is coupled to an air source and at least one product conveyance conduit of the air delivery system.

18. The air cart system of claim 16, wherein the fill hopper comprises an air lock configured to cyclically provide a portion of the second agricultural product to the inductor manifold.

19. The air cart system of claim 18, wherein the air lock is configured to provide the second agricultural product to the inductor manifold at a substantially equal rate to a rate at which the second agricultural product flows from the inductor manifold to the secondary product container.

20. The air cart system of claim 15, comprising at least one cyclone positioned within the secondary product container, wherein the at least one cyclone is configured to evenly distribute the second agricultural product within the secondary product container.

* * * * *